US010829622B2

(12) United States Patent
Ganesan et al.

(10) Patent No.: US 10,829,622 B2
(45) Date of Patent: Nov. 10, 2020

(54) RUBBER COMPOSITION FOR TIRES WITH IMPROVED WINTER PERFORMANCE AND ABRASION RESISTANCE

(71) Applicant: Apollo Tyres Global R&D B. V., Enschede (NL)

(72) Inventors: Swarupini Ganesan, Arnhem (NL); Sander Marinus, Enschede (NL); Hendrik Stevens, Hannover (DE)

(73) Assignee: APOLLO TYRES GLOBAL R&D B.V., Enschede (NL)

( * ) Notice: Subject to any disclaimer, the term of this patent is extended or adjusted under 35 U.S.C. 154(b) by 7 days.

(21) Appl. No.: 16/332,849

(22) PCT Filed: Sep. 14, 2017

(86) PCT No.: PCT/EP2017/073143
§ 371 (c)(1),
(2) Date: Mar. 13, 2019

(87) PCT Pub. No.: WO2018/050748
PCT Pub. Date: Mar. 22, 2018

(65) Prior Publication Data
US 2019/0218377 A1 Jul. 18, 2019

(30) Foreign Application Priority Data

Sep. 14, 2016 (GB) .................................. 1615606.9

(51) Int. Cl.
| | | |
|---|---|---|
| *C08L 9/06* | (2006.01) | |
| *B60C 1/00* | (2006.01) | |
| *C08K 5/31* | (2006.01) | |
| *C08K 3/22* | (2006.01) | |
| *C08K 3/06* | (2006.01) | |
| *C08L 7/00* | (2006.01) | |
| *C08L 9/00* | (2006.01) | |
| *C08K 5/47* | (2006.01) | |
| *C08L 91/00* | (2006.01) | |
| *C08K 3/36* | (2006.01) | |
| *C08K 3/04* | (2006.01) | |
| *C08K 5/09* | (2006.01) | |
| *C08K 5/548* | (2006.01) | |
| *B60C 11/00* | (2006.01) | |
| *C08C 19/00* | (2006.01) | |

(52) U.S. Cl.
CPC .............. *C08L 9/06* (2013.01); *B60C 1/0016* (2013.01); *B60C 11/0008* (2013.01); *C08C 19/00* (2013.01); *C08K 3/04* (2013.01); *C08K 3/06* (2013.01); *C08K 3/22* (2013.01); *C08K 3/36* (2013.01); *C08K 5/09* (2013.01); *C08K 5/31* (2013.01); *C08K 5/47* (2013.01); *C08K 5/548* (2013.01); *C08L 7/00* (2013.01); *C08L 9/00* (2013.01); *C08L 91/00* (2013.01); *C08L 2205/025* (2013.01); *C08L 2205/035* (2013.01); *C08L 2312/02* (2013.01)

(58) Field of Classification Search
CPC ....... B60C 1/0008; B60C 1/0016; C08L 9/00; C08L 91/00; C08L 9/06; C08L 7/00; C08L 2205/025; C08L 2312/02; C08L 2205/035; C08K 3/02; C08K 5/09; C08K 3/36; C08K 5/548; C08K 5/49; C08K 5/31; C08K 3/06; C08K 3/04; C08C 19/00
See application file for complete search history.

(56) References Cited

U.S. PATENT DOCUMENTS

| | | | |
|---|---|---|---|
| 4,482,678 A | | 11/1984 | Furukawa et al. |
| 4,824,908 A | * | 4/1989 | Tsutsumi et al. ..... B60C 1/0016 152/525 |
| 2012/0123018 A1 | | 5/2012 | Kanz et al. |
| 2012/0208919 A1 | | 8/2012 | Kanz et al. |
| 2013/0068270 A1 | | 3/2013 | Choi et al. |
| 2015/0119492 A1 | | 4/2015 | Vasseur, Jr. et al. |

FOREIGN PATENT DOCUMENTS

| | | |
|---|---|---|
| JP | 2012 158710 | 8/2012 |
| JP | 2013 023638 | 2/2013 |
| JP | 2013 023639 | 2/2013 |
| JP | 2013 023640 | 2/2013 |
| KR | 2013 0026967 | 3/2013 |
| WO | 2013/068270 | 5/2013 |
| WO | 2015/124681 | 8/2015 |
| WO | 2016/195053 | 12/2016 |

OTHER PUBLICATIONS https://en.wikipedia.org/wiki/Styrene-butadiene (Year: 2020).*
International Search Report and Written Opinion dated Nov. 27, 2017 issued in International Application No. PCT/EP2017/073143.
Search Report dated Mar. 10, 2017 issued in GB Application No. 1615606.9.
International Preliminary Report on Patentability dated Mar. 28, 2019 issued in International Application No. PCT/EP2017/073143.

* cited by examiner

*Primary Examiner* — Nathan M Nutter
(74) *Attorney, Agent, or Firm* — Renner, Otto, Boisselle & Sklar, LLP

(57) ABSTRACT

The present invention relates to a cross-linkable rubber composition, a cross-linked rubber composition obtained by cross-linking such a rubber composition, a method of preparing a tire and a tire. A cross-linkable rubber composition comprises, per hundred parts by weight of rubber (phr): 100 phr of a diene-based elastomer component with an average molecular weight Mn in a range of $\geq 100000$ to $\leq 5000000$ g/mol and a homopolymer of polybutadiene, wherein the homopolymer of polybutadiene has an average molecular weight Mn in a range of $\geq 10000$ to $\leq 45000$ g/mol and a glass transition temperature Tg in a range of $\geq -110°$ C. to $\leq -60°$ C.

10 Claims, 1 Drawing Sheet

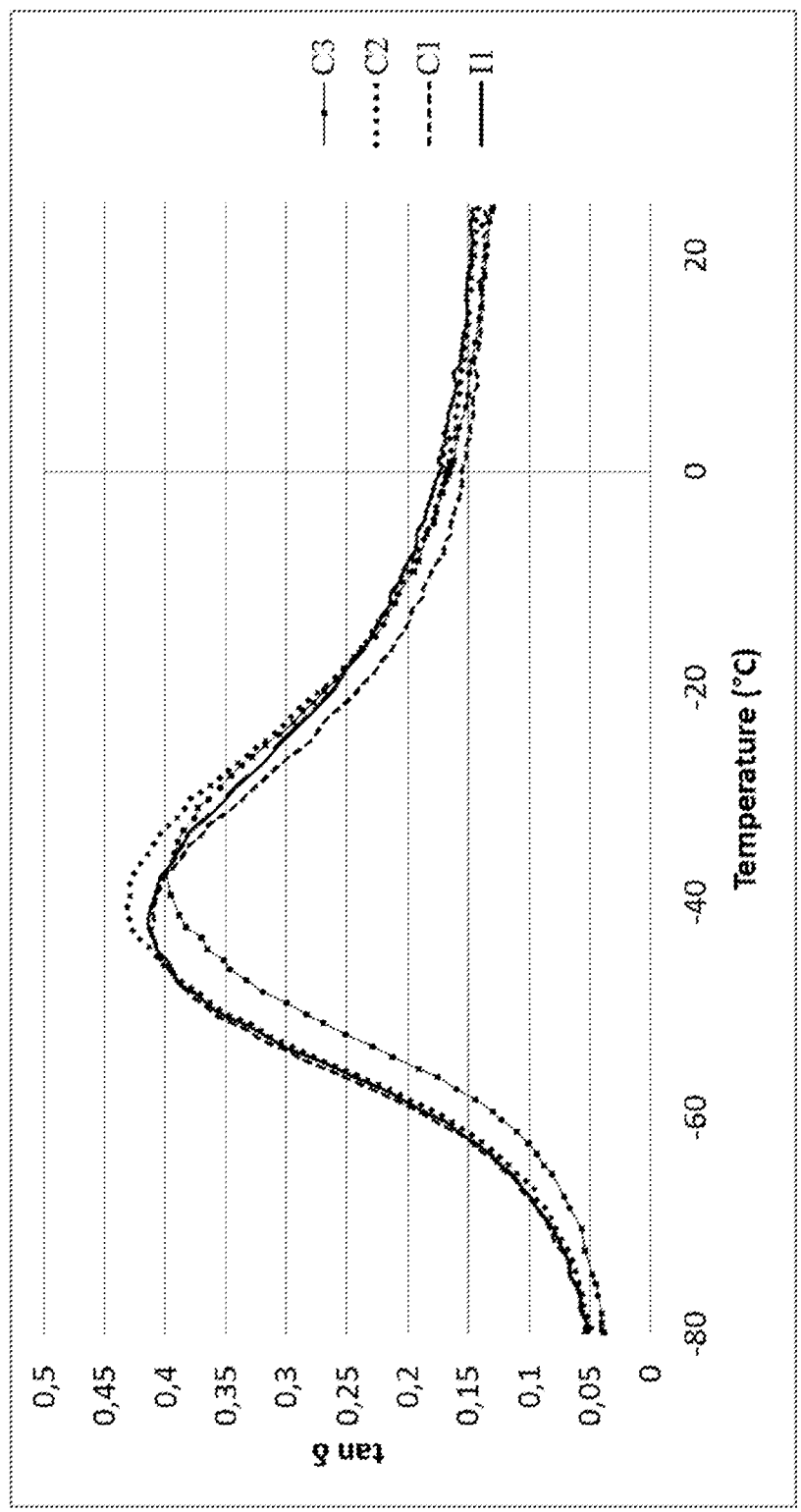

RUBBER COMPOSITION FOR TIRES WITH IMPROVED WINTER PERFORMANCE AND ABRASION RESISTANCE

RELATED APPLICATIONS

This application is a national phase entry of International Application No. PCT/EP2017/073143 filed on Sep. 14, 2017 and published in the English language, which claims priority to GB Application No. 1615606.9 filed Sep. 14, 2016, both of which are hereby incorporated by reference.

The present invention relates to a cross-linkable rubber composition, a cross-linked rubber composition obtained by cross-linking such a rubber composition, a method of preparing a tire and a tire.

The tread is one of the important portions of a pneumatic tire which contributes enormously to the overall performance of a tire. A tire has to perform well in severe weather conditions and it has to exhibit a variety of performances such as wet grip, abrasion resistance and low rolling resistance while retaining good performance on snow and ice.

A tread compound can be optimised to exhibit good winter performance by using polymers with a low glass transition temperature (Tg) but it normally results in poor wet grip properties. On the other hand, tuning the rubber compound to improve wet grip properties often leads to impairment in abrasion resistance, winter performance and rolling resistance. For example, tread rubber blends containing high loadings of silica generally result in a tire with an improvement in wet grip. However, it generally also results in a negative effect on abrasion resistance and rolling resistance.

In addition, it is known that a high loading of oil in the rubber mixture can result in compounds that remain soft at low temperatures to obtain good winter properties. However, the high loading of oil will impair abrasion resistance and aging resistance. In addition, high loading of oil in the rubber mixture can result in migration of oil to the surface and causes mould fouling during production processes.

In order to obtain good winter tires, all properties need to be improved simultaneously. In recent years, attempts have been made to use low molecular weight polymers, so-called liquid polymers, in addition to or as a partial substitution for conventional oils which aim to improve abrasion resistance, winter properties and/or eliminate mould fouling.

EP2655087 for example, addresses the optimisation of rolling resistance and abrasion resistance without compromising dry grip properties. A rubber blend, particularly for pneumatic vehicle tires, harnesses, straps, and hoses is disclosed. The rubber blend is characterised by the following composition: at least one rubber blend A consisting of one solid stirene-butadiene rubber with an average molecular weight Mn of 100,000 to 5,000,000 g/mol and a liquid butadiene rubber with an average molecular weight Mn of 500 to 9000 g/mol, said stirene-butadiene rubber being solution-polymerised or emulsion-polymerised, as well as 30 to 300 phr of at least one silicic acid and further blend components.

EP1035164 at the other hand relates to providing a tire tread rubber composition with a combination of good, dry traction and durability by use of high Tg diene-based elastomers together with a minor amount of a high Tg liquid high vinyl polybutadiene polymer in place of at least a portion of an aromatic rubber processing oil. A rubber composition characterised by being comprised of, based upon its rubber component, (A) 100 parts by weight (phr) of at least one solid diene-based elastomer selected from homopolymers and copolymers of conjugated diene and copolymers of at least one conjugated diene with a vinyl aromatic compound selected from stirene and alpha-methylstirene; wherein said elastomers have a Tg of lower than +10° C. and wherein at least 50 total weight percent of said elastomers have a Tg above −40° C., (B) from 5 to 50 phr of a liquid polymer of high vinyl polybutadiene having a vinyl (1,2-) content in a range of 40 to 95 percent and a Tg in a range of −5° C. to −40° C. is disclosed.

EP0585012 discloses a rubber composition satisfying wear resistance and fracture properties as well as wet skid resistance, ice skid resistance and dry gripping property by including at least 30% by weight of a rubber ingredient which consists of 100 parts by weight of a particular branched stirene-butadiene copolymer and 15-100 parts by weight of a particular low molecular weight butadiene polymer and has a Mooney viscosity of 30-100.

However, none of the patents simultaneously increase winter performance, wet grip and abrasion resistance.

The present invention has the object of providing a rubber composition, useful for tire treads, which when it is cured and employed in a vehicle tire, displays both an increased winter performance and abrasion resistance without compromising on wet grip.

This object is achieved by a cross-linkable rubber composition, the cross-linkable rubber composition comprising, per hundred parts by weight of rubber (phr):

100 phr of a diene-based elastomer component with an average molecular weight Mn in a range of ≥100000 to ≤5000000 g/mol and
a homopolymer of polybutadiene,
wherein the homopolymer of polybutadiene has an average molecular weight Mn in a range of ≥10000 to ≤45000 g/mol and a glass transition temperature Tg in a range of ≥−110° C. to ≤−60° C.

Surprisingly, it was observed that a rubber mixture according to the invention exhibited an improvement in abrasion resistance, wet grip and winter properties at the same time.

The rubber composition according to the invention contains a homopolymer of polybutadiene with a molecular weight Mn of ≥10000 to ≤45000 g/mol. In general, homopolymers of polybutadiene having a molecular weight Mn ranging from ≥2000 to ≤50000 g/mol are known as liquid polybutadiene. In this context, a homopolymer of polybutadiene according to the invention can be considered as a high molecular weight liquid polybutadiene, whereas homopolymers of polybutadiene ranging from ≥2000 g/mol to ≤9000 g/mol (Mn) can be considered as low to medium molecular weight liquid polybutadienes.

A homopolymer of polybutadiene according to the invention has a molecular weight (Mn) in a range of ≥10000 to ≤45000 g/mol, more preferred ≥20000 to ≤30000 g/mol, most preferred ≥24000 to ≤28000 g/mol and a glass transition temperature Tg in a range of ≥−110° C. to ≤−60° C., more preferred ≥−100° C. to ≤−80° C., most preferred ≥−100° C. to ≤−90° C. Using a homopolymer of polybutadiene with a molecular weight and Tg in these ranges will exhibit a positive effect in winter properties, as it will shift the overall Tg of the cross-linked rubber compositions to lower temperatures, which generally corresponds with good winter performance. In addition, these ranges will result in a positive effect on wet grip due to an overall peak broadening and hence a higher tan δ at 0° C. Without being wished to be bound by theory, it is believed that this is related to the reduced miscibility of a relative high molecular weight liquid polybutadiene with the diene-based elastomer compound of the cross-linked rubber compositions. In addition, the abrasion resistance is also improved. It is believed that the abrasion resistance of the vulcanised rubber composition is improved because of the Tg-shift of the rubber composition to lower temperatures. In addition, the high molecular weight homopolymer of polybutadiene according to the invention is likely to cross-link during vulcanisation, which increases abrasion resistance even more.

In the practice of this invention, the rubber composition may be a tire tread rubber composition, and may be comprised of at least one diene-based elastomer, or rubber. Thus, it is considered that the elastomer is a sulphur curable, vulcanisable elastomer. The elastomers utilised in accordance with this invention are typically derived from the polymerisation of conjugated diene monomers which typically contain from 4 to 12 carbon atoms and preferably contain from 4 to about 8 carbon atoms. Representative examples of such conjugated diene monomers include, for example, 1,3-butadiene and isoprene. The elastomer can also contain units derived from copolymerisation of various vinyl aromatic monomers with one or more of such conjugated dienes such as, for example, stirene and alpha-methylstirene. A non-exhaustive exemplary list of elastomers which can be prepared from the diene monomers and utilised in the rubber compositions of this invention include 1,4-polybutadiene (BR), stirene-butadiene rubber (SBR), synthetic cis 1,4-polyisoprene, natural cis 1,4-polyisoprene (NR), isoprene/butadiene rubber, stirene/isoprene rubber, high vinyl polybutadiene rubber having a vinyl 1,2-content in a range of about 40 to about 95 percent, butadiene/acrylonitrile rubber, carboxylated butadiene/acrylonitrile rubber, and stirene/isoprene/butadiene terpolymer rubbers. The above mentioned elastomers have an average molecular weight Mn in a range of ≥100000 to ≤5000000 g/mol, which represent the commonly used "solid" diene based elastomers.

It is further understood that in formulations discussed in connection with the present invention the phr amount of all solid diene-based elastomer components adds up to 100 phr.

The phr data (parts per hundred parts of rubber by weight) used in this specification are the conventional quantitative data used for mixture formulations in the rubber industry. The amount added in parts by weight of the individual substances in this specification is based on 100 parts by weight of the total mass of all of the high-molecular-weight, and therefore solid, rubbers present in the mixture.

All of the molecular weights used in this specification were determined by using gel permeation chromatography (GPC) in accordance with DIN 55672-1 or ISO 16564.

Glass transition temperatures (Tg) of the homopolymer of polybutadiene used in this specification can be obtained with differential scanning calorimetry (DSC) according to ISO 22768.

The cross-linkable rubber composition according to the invention comprises cross-linkable groups in the individual rubber components. They may be cross-linked (cured, vulcanised) by methods known to a skilled person in the rubber technology field.

The cross-linkable rubber compositions may be sulfur-vulcanisable and/or peroxide-vulcanisable. Other vulcanisation systems may also be used. If desired, additives can be added. Examples of usual additives are stabilisers, antioxidants, lubricants, fillers, dyes, pigments, flame retardants, conductive fibres and reinforcing fibres.

If desired, the cross-linkable rubber composition can also comprise a coupling agent. Suitable coupling agents comprise silane compounds. Particularly suitable silane compounds comprise di- and tetrasulphides. It is possible for the rubber composition to be provided with a conductive filler to make it at least partially conductive.

Further embodiments and aspects of the present invention will now be described. They can be combined freely unless the context clearly indicates otherwise.

In one embodiment of the rubber composition according to the invention, the composition comprises ≥5 to ≤30 phr of the homopolymer of polybutadiene, preferably ≥5 to ≤20 phr, most preferred ≥5 to ≤15 phr.

These ranges are preferred because it is believed that the most favourable properties of the final compound can be obtained, optimising both winter properties and wet grip properties.

An additional advantage could be that adding the homopolymer of polybutadiene in these ranges can partially replace the oil, which is typically present as a processing aid, while avoiding other processing issues such as sticking to the mills or slippage during mixing, thereby providing a good processability of the resulting rubber composition. An advantage of using the homopolymer of polybutadiene at least partially instead of oil is a substantial reduction of oil migration and process related issues such as mould fouling, as the homopolymer of polybutadiene according to the invention can be cross-linked during vulcanisation as well.

In another embodiment of the rubber composition according to the invention, the composition comprises a homopolymer of polybutadiene with a vinyl (1,2-) content in a range of ≥0 to ≤40%, more preferred ≥1 to ≤35%, most preferred ≥5 to ≤25%. In general, a low vinyl content corresponds with a low Tg of the polymer, therefore a low vinyl content of the homopolymer of polybutadiene is likely to result in a low Tg of the corresponding vulcanised rubber mixture, increasing winter properties. The vinyl content for example, can be determined by $^1$H-NMR and calculated from the obtained spectrum or can be determined from a FTIR spectrum. In another embodiment of the rubber composition according to the invention, the composition comprises a homopolymer of polybutadiene with a melt viscosity of range of ≥15 to ≤500 Pa s at 38° C., more preferred ≥25 to ≤250 Pa s at 38° C. Melt Viscosity at 38° C. can be obtained using a Brookfield viscometer available from Brookfield Engineering Labs, Incorporated.

When the melt viscosity of the homopolymer of polybutadiene falls within the above-specified range, the resulting rubber composition can be easily kneaded and can be improved in processability, and the contamination of the mould can also be suppressed. In addition, homopolymers of polybutadiene in these ranges have similar advantages as common oils for processing, and can therefore be used as at least partially substitutes for oils. Examples of common oils are DAE (Distillated Aromatic Extracts) and/or RAE (Residual Aromatic Extract) and/or TDAE (Treated Distillated Aromatic Extracts) and/or MES (Mild Extracted Solvents) and/or naphthenic oils and/or vegetable oils As the homopolymers of polybutadiene can be cross-linked during vulcanisation, oil related problems such as mould fouling and oil migration might also be reduced.

In another embodiment of the rubber composition according to the invention, the composition comprises a homopolymer of polybutadiene which comprises an end-chain or mid-chain chemical modification, for example homopolymers of polybutadiene comprising isocyanate groups, hydroxyl groups, silane-sulfide groups, amino groups and/or carboxylic anhydride groups. Using such chemically modified homopolymers of polybutadiene has the additional advantage that the tire properties can be tuned even further.

In another embodiment of the rubber composition according to the invention, the diene-based elastomer component comprises a plurality of diene-based elastomers.

In another embodiment of the rubber composition according to the invention, the diene-based elastomer component comprises a stirene-butadiene rubber. Preferably, the rubber composition comprises of a mixture a stirene-butadiene rubber (SBR) component, a natural rubber (NR) and/or a butadiene rubber (BR).

The SBR rubber component may contain one type of SBR rubber or several different types. Preferably, at least one type of SBR rubber is manufactured according to the solution process (SSBR or solution SBR).

In a preferred embodiment of the rubber composition according to the invention the stirene-butadiene rubber component comprises a first stirene-butadiene rubber and a second stirene-butadiene rubber which is different from the first stirene-butadiene rubber.

Preferably the first stirene-butadiene rubber is a functionalised stirene-butadiene rubber and the second stirene-butadiene rubber is an unfunctionalised or functionalised stirene-butadiene rubber. Examples for functionalised stirene-butadiene rubbers are those comprising isocyanate groups, hydroxyl groups, silane-sulfide groups, amino groups and/or carboxylic anhydride groups.

It is also preferred that this rubber composition comprises ≥40 phr to ≤90 phr of a stirene-butadiene rubber component and ≥10 phr to ≤60 phr of a natural rubber or butadiene rubber component or a combination thereof. More preferred, the rubber composition comprises ≥5 phr to ≤25 phr of a first SBR, ≥25 phr to ≤45 phr of a second SBR, ≥20 phr to ≤40 phr of BR and ≥0 phr to ≤35 phr of NR. Most preferred, the rubber composition comprises ≥5 phr to ≤25 phr of a first SBR, ≥25 phr to ≤45 phr of a second SBR, ≥20 phr to ≤40 phr of BR and ≥15 phr to ≤35 phr of NR.

It is also preferred that the rubber composition comprises a filler component, examples of such a. filler component are carbon black, silica or a combination of both. The total amount of filler in the rubber composition is preferably ≥50 phr to ≤180 phr, more preferably ≥80 phr to ≤150 phr, most preferably ≥90 phr to ≤130 phr.

The homopolymer of polybutadiene according to the invention can be used as plasticiser in the rubber mixture.

The rubber mixture can also comprise from 0 to 60 phr, preferably from 0.1 to 50 phr, preferably from 0.1 to 40 phr, of at least one further additional plasticiser. This further plasticiser is one selected from the group consisting of mineral oils and/or synthetic plasticisers and/or fatty acids and/or fatty acid derivatives and/or resins and/or factices and/or glycerides and/or terpenes and/or biomass-to-liquid oils (BTL oils), particular preference being given here to mineral oils. If mineral oil is used, this is preferably one selected from the group consisting of DAE (Distilled Aromatic Extracts) and/or RAE (Residual Aromatic Extract) and/or TDAE (Treated Distilled Aromatic Extracts) and/or MES (Mild Extracted Solvents) and/or naphthenic oils.

Another aspect of the present invention is a cross-linked rubber composition obtained by cross-linking the cross-linkable rubber composition according to the invention. This cross-linked rubber composition can be part of a tire, preferably as a tread.

In one embodiment the cross-linked rubber composition has a tan δ at 0° C. of ≥0.16 to ≤0.35, more preferred ≥0.17 to ≤0.25. These values can be determined by recording a DMA curve according to ISO 4664-1, with a frequency of 10 Hz, a dynamic strain of 0.1% and a temperature range from −80 to +25° C.

In another embodiment the cross-linked rubber composition has a glass transition temperature Tg of ≥−50° C. to ≤−35° C., more preferred ≥−45° C. to ≤−40° C. These values can be determined by recording a DMA curve according to ISO 4664-1, with a frequency of 10 Hz, a dynamic strain of 0.1% and a temperature range from −80 to +25° C., where the glass transition temperatures (Tg) of corresponds to the temperature at the maximum of the tan δ curve.

In another embodiment the cross-linked rubber composition has an abrasion resistance of ≤75 mm$^3$, more preferred ≤70 mm$^3$. These values can be determined by ISO 4649, performed at ambient temperature of 24±2° C. The test specimens are flat and parallel with a thickness of at least 10 mm and a diameter of 16 mm±1 mm.

In another embodiment the cross-linked rubber composition has an elastic modulus G' at −20° C. of ≥25 to ≤40 MPa, more preferred ≥25 to ≤35 MPa, most preferred ≥30 to ≤35 MPa. These values can be determined by recording a DMA curve according to ISO 4664-1, with a frequency of 10 Hz, a dynamic strain of 0.1% and a temperature range from −80 to +25° C.

In a preferred embodiment the cross-linked rubber composition has a tan δ at 0° C. of ≥0.16 to ≤0.35, more preferred ≥0.17 to ≤0.25, a glass transition temperature Tg of ≥−50° C. to ≤−35° C., more preferred ≥−45° C. to ≤−40° C. and an abrasion resistance of ≤75 mm$^3$, more preferred ≤70 mm$^3$ In another preferred embodiment the cross-linked rubber composition has a tan δ at 0° C. of ≥0.16 to ≤0.35, more preferred ≥0.17 to ≤0.25, an elastic modulus G' at −20° C. of ≥25 to ≤40 MPa, more preferred ≥25 to ≤35 MPa, most preferred ≥30 to ≤35 MPa and an abrasion resistance of ≤75 mm$^3$, more preferred ≤70 mm$^3$.

In another preferred embodiment the cross-linked rubber composition has a tan δ at 0° C. of ≥0.16 to ≤0.35, more preferred ≥0.17 to ≤0.25, an elastic modulus G' at −20° C. of ≥25 to ≤40 MPa, more preferred ≥25 to ≤35 MPa, most preferred ≥30 to ≤35 MPa, a glass transition temperature Tg of ≥−50° C. to ≤−35° C., more preferred ≥−45° C. to ≤−40° C. and an abrasion resistance of ≤75 mm$^3$, more preferred ≤70 mm$^3$.

The present invention also relates to a method of preparing a tire, comprising the steps of:
 providing a tire assembly comprising a cross-linkable rubber composition according to the invention;
 cross-linking at least the cross-linkable rubber composition according to the invention in the tire assembly.

The present invention also encompasses a tire comprising a tire tread, wherein the tire tread comprises a cross-linked rubber composition according to the invention.

The cross-linkable rubber composition according to the invention comprises cross-linkable groups in the individual rubber components. They may be cross-linked (cured, vulcanised) by methods known to a skilled person in the rubber technology field.

The cross-linkable rubber compositions may be sulfur-vulcanisable and/or peroxide-vulcanisable. Other vulcanisation systems may also be used. The cross-linkable rubber composition is preferably cross-linked using a sulfur vulcanisation system, which is conducted in the presence of sulfur-vulcanising agents. Examples of suitable sulfur-vulcanising agents include elemental sulfur (free sulfur) or sulfur donating vulcanising agents, for example, an amine disulphide, polymeric polysulfide or sulfur olefin adducts. Preferably, the sulfur vulcanising agent is elemental sulfur. As known to those skilled in the art, sulfur-vulcanising agents are used in an amount ranging from about 0.5 to about 4 phr, or even, in some circumstances, up to about 8 phr.

If desired accelerators can be added to the cross-linkable rubber composition to control the time and temperature required for vulcanisation. Examples of suitable types of accelerators are amines, disulphides, guanidines, thioureas, thiazoles, thiurams, sulfenamides, dithiocarbamates and xanthates. Vulcanisation retarders may also be used.

Zinc oxide can be added as activator, mostly in combination with fatty acids (for example, stearic acid).

As known to those skilled in the art, the cross-linkable rubber composition is normally vulcanised under elevated temperatures for a defined time. Typical temperatures for vulcanisation vary from 110° C. to 180° C., whereas the typical time for vulcanization is normally between 5 minutes to 3 hours. These settings can be adjusted accordingly, for example to optimise the vulcanisation conditions for the size of the tire or for the cross-linkable rubber compositions in the tire If desired, other additives can be added to the cross-linkable rubber composition. Examples of usual additives are stabilisers, antioxidants, lubricants, fillers, dyes, pigments, flame retardants, conductive fibres and reinforcing fibres.

If desired, the cross-linkable rubber composition can also comprise a coupling agent. Suitable coupling agents comprise silane compounds. Particularly suitable silane compounds comprise di- and tetrasulphides. It is possible for the rubber composition to be provided with a conductive filler to make it at least partially conductive.

The present invention will be further described with reference to the following FIGURE and examples without wishing to be limited by them.

The FIGURE shows DMA curves from the inventive example and comparative examples at a temperature range from −80° C. to 20° C.

EXAMPLE

Homopolymers of polybutadienes with several molecular weights and Tg's were mixed with a standard recipe as given in table 1 and vulcanised to study the DMA curve according to ISO 4664-1, with a frequency of 10 Hz, a dynamic strain of 0.1% and a temperature range from −80 to +25° C. The abrasion resistance (wear test) was measured according to ISO 4649.

The properties of the ingredients can be obtained by methods commonly used in the art. For example the average molecular weight Mn can be measured by GPC according to ASTM D6579-11. Melt Viscosity can be measured at 38° C. with a Brookfield viscometer. Vinyl content can be measured by 1H-NMR or FTIR and determined from the obtained spectrum. Glass transition temperatures (Tg) of the homopolymers of polybutadiene can be obtained with differential scanning calorimetry (DSC) according to ISO 22768. Glass transition temperatures (Tg) of the cross-linked rubber mixture were determined from the DMA measurement, corresponding to the temperature at the maximum of the tan δ curve (the FIGURE).

TABLE 1

| | |
|---|---|
| NR | 25 phr |
| BR | 31 phr |
| SSBR (50% vinyl 21% styrene) | 12 phr |
| SSBR (50% vinyl 21% styrene, oil extended (27.3%)) | 44 phr (32 phr SSBR) |

TABLE 1-continued

| | |
|---|---|
| Homopolymer of polybutadiene or oil | 10 phr |
| Carbon Black (N375) | 5 phr |
| Silica | 100 phr |
| Silane (TESPD, bis-triethoxysilylpropyldisulfidosilane) | 6.5 phr |
| Process oil | 17 phr |
| Zinc Oxide | 2 phr |
| Stearic Acid | 1 phr |
| Antioxidant/Antiozonant | 6 phr |
| Processing promoter | 8 phr |
| Sulphur | 1.75 phr |
| TBBS (N-tert-butyl-2-benzothiazyl sulfenamide) | 1.75 phr |
| DPG (diphenyl guanidine) | 2.5 phr |

The variation of homopolymers of polybutadiene and the properties of the compound are given in Table 2. The corresponding graph is shown in the FIGURE.

It is apparent from the results that the rubber composition according to the invention (I1), with a liquid homopolymer of polybutadiene with a high average molecular weight offers a well-balanced combination of good abrasion resistance, good winter performance and good wet grip compared to the references.

The inventive example (I1) has a much better abrasion resistance compared to comparative example 2 (C2) and 3 (C3), and is only slightly less compared to comparative example 1 (C1). In terms of winter performance, the examples with liquid homopolymer of polybutadiene all show a Tg shift to lower temperature and a G' (−20° C.) compared to comparative example 3 (C3), with oil. However, the inventive example (I1) also displays an improvement in Tan δ (0° C.) compared to the other examples, corresponding to enhanced wet grip.

In summary, the rubber composition according to the invention not only decreases Tg to lower temperatures, e.g. compared to comparative example 3 (C3) lacking liquid polybutadiene, but also broadens the peak in the DMA curve (the FIGURE), thereby gaining on wet grip compared to comparative example 1 and 2 with liquid homopolymer of polybutadiene according to the prior art. Without being wished to be bound by theory it is believed that this is related to the reduced miscibility of a relative high molecular weight liquid homopolymer of polybutadiene with the diene-based elastomer compound of the cross-linked rubber compositions. In addition, a good abrasion resistance is maintained with respect to the comparative examples.

TABLE 2

| | I1[1] | C1[2] | C2[3] | C3[4] |
|---|---|---|---|---|
| wear (DIN) | 69.17 | 58.63 | 86.67 | 87.65 |
| Tg | −41.80 | −42.12 | −40.49 | −37.54 |
| G' (−20° C.) | 32.85 | 36.68 | 30.4 | 42.57 |
| Tan δ (0° C.) | 0.174 | 0.154 | 0.168 | 0.167 |

[1]Homopolymer of polybutadiene: LBR 305 of Kuraray, Mn: 26000 g/mol, Tg: −95° C., melt viscosity (38° C.): 40 Pa S, vinyl content: 16.7%
[2]Homopolymer of polybutadiene: LBR 307 of Kuraray, Mn: 8000 g/mol, Tg: −95° C., melt viscosity (38° C.): 1.5, vinyl content: 5.9%
[3]Homopolymer of polybutadiene: Ricon 130 of Cray Valley, Mn: 2500 g/mol, Tg: −85° C., vinyl content: 28%
[4]Oil: TDAE oil Therefore, a rubber mixture comprising, per hundred parts by weight of rubber (phr), 100 phr of a diene-based elastomer component with an average molecular weight Mn in a range of ≥100000 to ≤5000000 g/mol and a homopolymer of polybutadiene, wherein the homopolymer of polybutadiene has an average molecular weight Mn in a range of ≥10000 to ≤45000 g/mol and a Tg in a range of ≥−110° C. to ≤−60°

C. results in an excellent balance of good abrasion resistance, good winter performance and good wet grip.

The invention claimed is:

1. A cross-linkable rubber composition, the cross-linkable rubber composition comprising, per hundred parts by weight of solid rubber (phr):
100 phr of a diene-based elastomer component with an average molecular weight Mn in a range of ≥100000 to ≤5000000 g/mol and
a homopolymer of polybutadiene,
wherein the homopolymer of polybutadiene has
an average molecular weight Mn in a range of ≥10000 to ≤45000 g/mol and
a glass transition temperature Tg in a range of ≥−110° C. to ≤−60° C.,
wherein the rubber composition comprises ≥5 to ≤15 phr of the homopolymer of polybutadiene, and
wherein the diene-based elastomer component comprises ≥40 phr to ≤90 phr of a styrene-butadiene rubber component comprising a first styrene-butadiene and a second butadiene rubber that is different from the first styrene-butadiene rubber and ≥10 phr to ≤60 phr of a combination of a natural rubber and a butadiene rubber.

2. The rubber composition according to claim 1, wherein the homopolymer of polybutadiene has a vinyl (1,2-) content in a range of ≥0 to ≤40 wt %.

3. The rubber composition according to claim 1, wherein the homopolymer of polybutadiene has a melt viscosity of range of ≥15 to ≤500 Pa s at 38° C.

4. A cross-linked rubber composition obtained by cross-linking the cross-linkable rubber composition according to claim 1.

5. The cross-linked rubber composition according to claim 4 with a tan δ at 0° C. of ≥0.16 to ≤0.35.

6. The cross-linked rubber composition according to claim 4 with a glass transition temperature Tg of ≥−50° C. to ≤−35° C.

7. The cross-linked rubber composition according to claim 4 with an abrasion resistance of ≤75 mm³.

8. The cross-linked rubber composition according to claim 4 with an elastic modulus G' at −20° C. of ≥25 to ≤40 MPa.

9. A method of preparing a tire, comprising the steps of:
providing a tire assembly comprising a cross-linkable rubber composition according to claim 1; and
cross-linking at least the cross-linkable rubber composition in the tire assembly.

10. A tire comprising a tire tread, characterised in that the tire tread comprises a cross-linked rubber composition according to claim 4.

* * * * *